April 26, 1949.  J. F. HUNTER  2,468,069
LIQUID SEPARATION METHOD AND APPARATUS
Filed July 21, 1944  2 Sheets-Sheet 1
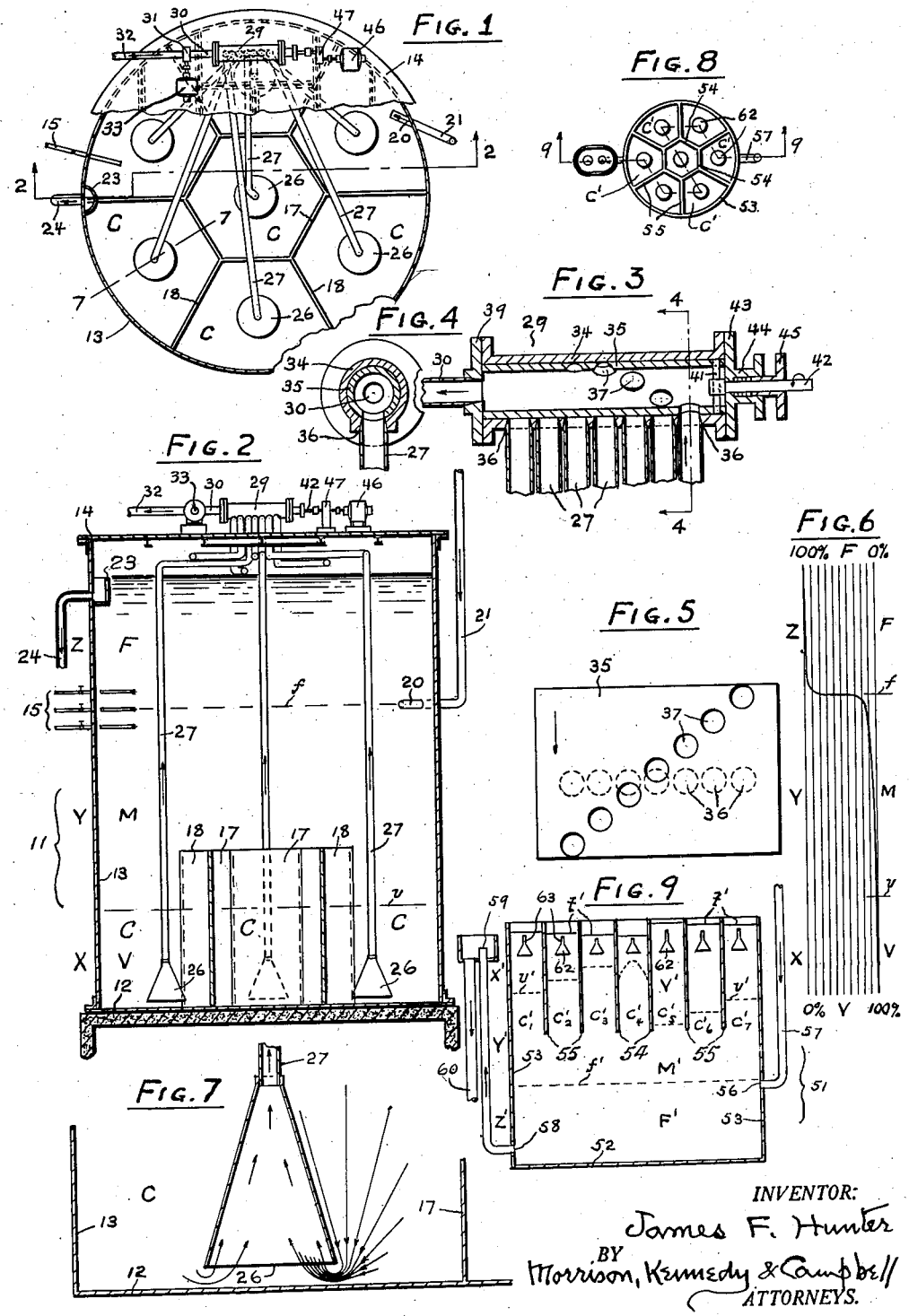
INVENTOR:
James F. Hunter
BY Morrison, Kennedy & Campbell
ATTORNEYS.

April 26, 1949. J. F. HUNTER 2,468,069
LIQUID SEPARATION METHOD AND APPARATUS
Filed July 21, 1944 2 Sheets-Sheet 2
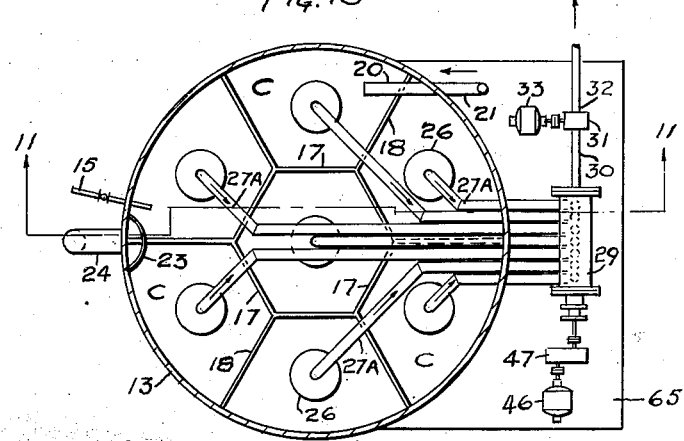
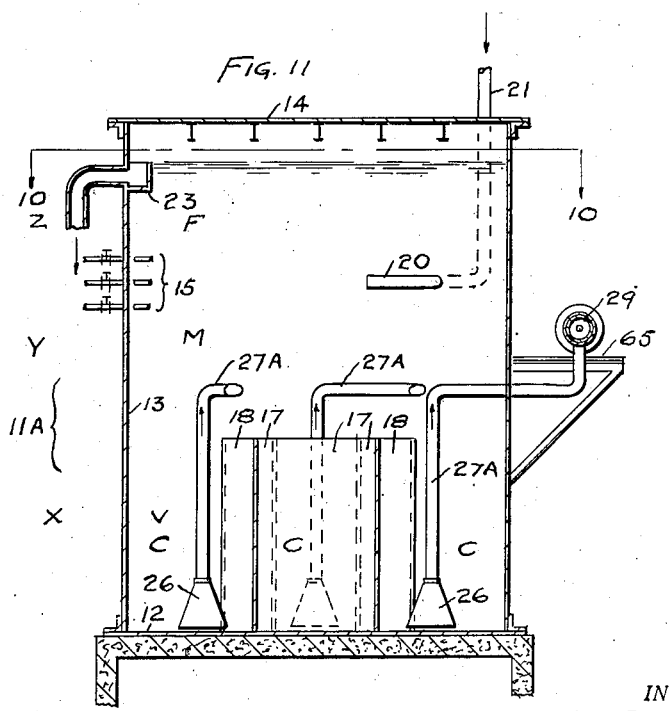
INVENTOR:
James F. Hunter
BY
Morrison, Kennedy & Campbell
Attorneys.

Patented Apr. 26, 1949

2,468,069

UNITED STATES PATENT OFFICE 2,468,069

LIQUID SEPARATION METHOD AND APPARATUS

James F. Hunter, New Rochelle, N. Y.

Application July 21, 1944, Serial No. 546,003

26 Claims. (Cl. 210—51)

This invention pertains to the art of liquid separation, and involves both method and apparatus; a prior instance of such class of apparatus being that disclosed in my prior Patent No. 2,084,958 granted June 22, 1937, wherein liquors containing mixtures and emulsions are treated to break the emulsions and otherwise to prepare the liquors for subsequent separation or decanting of components; the present invention dealing more particularly with such final separation of such components, being in a sense complementary to the disclosure of my said patent although the novel features are of wider utility and not confined to use with such disclosure.

Herein the principles of the present invention are illustratively shown as applied to the separation, in a decanter or similar vessel, of two liquids differing appreciably from each other both in density, by which is meant specific gravity, and viscosity; although more than two liquids can be similarly handled. As an example may be taken a combination of water and tar, as the hot overflow from the washboxes of a water-gas generating plant, the water being relatively more fluent, the tar more viscous and of greater density. These two liquids constitute so-called immiscible liquids, having a general resistance to thorough or permanent mixing, but being combined or temporarily mixed together in a sense to present a problem as to their effective and practically expeditious separation, enabling convenient or safe disposal or utilization of the respective separated components. A further component, as oil, may be present, and this may be miscible with the tar but not with the water, but tends to keep independent in the triple mixture, and to remain with the water when the tar is separated away and withdrawn, being supplementally readily separable from the water.

Before describing the invention hereof the general subject will be referred to. In the continuous separation of immiscible component liquids from combinations of such liquids, especially such as occur as waste products in manufacturing processes, the withdrawal of a separated component from the bulk of liquid in the separating apparatus frequently proves difficult to accomplish without suffering objectionable recombining or remixing to a greater or less extent. This difficulty is most pronounced when the gravity differential of the component liquids is relatively small and their viscosity differential is great. An example of this condition and difficulty occurs, as already stated, in the separation from each other of tar and water in the carbureted water-gas process of producing manufactured gas. The tendency of the liquids to "channel" during flow toward the outlet of the separating vessel or decanter, as with the withdrawal of the more viscous component or tar, is very marked. The verb "channel" designates certain internal liquid movements which occur because of the positioning of the components and their characteristics, wherein the lighter, less viscous and faster moving unseparated or partially separated mixture of tar and water, inherently movable more rapidly than the heavier, more viscous and slower moving tar, tends to find its way through the tar stratum and to reach the tar withdrawal outlet and be withdrawn to a serious extent along with the previously separated tar, with which it thus becomes recombined or remixed, thereby reducing the efficiency of the separating system, and resulting in delivery of tar of materially reduced concentration, which may impair its value for combustion or other utilization.

When the final separating process is upon the principles of decantation or gravity classification of the component liquids, following the breaking of any emulsion present, there will exist in the decanter three different, fairly definite and practically determinable layers or zones, consisting of the lighter component (as water or oil and water), separated upwardly and collected at the top; the heavier component, as tar, separated downwardly and accumulated at the bottom; and an intermediate layer composed of both the lighter and heavier components, in process of separation, and in varying proportions ranging from a minimum of the heavier component at the top of the middle zone to a minimum of the lighter component at the bottom thereof; as a standard, for example, tar with not over one percent of other liquid components being considered as separated tar. The separated light and heavy components are currently withdrawn from the decanter, which withdrawal, under certain conditions, and especially as to the more viscous liquid, presents the long existing difficulty, including channelling and remixing, which the method and apparatus of this invention are designed to overcome.

Under most conditions the heavier component will be the more viscous and the viscosity of the mixture in the intermediate layer, where the separating process is proceeding, will vary with the proportions of the more viscous and more fluent components respectively.

When the static balance of the separated and separating components in the vessel becomes disturbed upon the commencement of the withdrawal of the more viscous component, usually downwardly, the entire content of the decanter is thereby put into motion tending to restore the balanced condition. The movement is in the general direction of the withdrawal outlet or outlets and at varying velocities depending on such factors as viscosities and directions of flow. For any particular density and viscosity of material, the rearranging movements of individual particles downward vertically will be the most rapid while movement substantially horizontally will be the least rapid.

Under the usual conditions wherein the relation of the density and the viscosity of the component liquids are such that the static balance does not become continuously restored, nor be substantially maintained, by the movement of the liquids during the withdrawal actions, then the greatest reduction in the depth of the zone or layer of separated more viscous component occurs at that point of withdrawal where the movement is vertical and is most rapid. If the removal of the separated more viscous component is continued to the point where the material of the unseparated intermediate layer, by channelling action, arrives at and enters the withdrawal outlet then the channelling tendency becomes accentuated since the material of the unseparated intermediate layer is of lower viscosity and concentration than the separated more viscous component and moves along, through the formed channel, with greater rapidity.

As withdrawal of material from the intermediate layer is further continued, the proportion of the less viscous component present in the withdrawn liquid further increases, and the material withdrawn becomes progressively less viscous and moves with greater rapidity so that a progressively greater volume and proportion of material from the unseparated intermediate layer reaches the withdrawal outlet. Since the total quantity of separated component to be withdrawn is determined as for some given condition of operation, the increasing extent of withdrawal of material from the intermediate layer progressively reduces the efficiency of separation and concentration of the desired product. When the removal of the separated component is discontinued, as at the end of a given period of withdrawal, the various liquid movements are continued either in the same or reversed direction and they proceed until finally the static balance becomes reestablished.

When conditions are such that the static balance is not maintained during withdrawal of the more viscous component, continuous removal of this component at a given outlet will in time cause channelling at such outlet. Intermittent withdrawal at a given outlet, because of its shortened period, necessarily accelerates the rate of removal, and thereby accentuates the tendency to channel.

Known prior systems, with respect to the liquid separation problem, took only limited cognizance of the internal liquid movements whereby the entire content of a decanter or tank is affected by withdrawal at any given outlet point or mouth and is put in motion toward such withdrawal outlet. The attention previously given to this disturbing phenomenon resulted only in the use of two or more withdrawal ports or outlets in tanks of great area, which are operated singly or in mutiple as dictated by the results obtainable. The process involved also the necessity for further treatment such as heating and settling in subsequent extensive apparatus to accomplish separation.

The method and apparatus of my prior invention, previously referred to, provides the means for the mechanical breaking of emulsions and for the preparation of the component liquids for complete gravity separation in the primary separator. Because of the deficiency in the prior known systems the full benefit of my earlier patent has not been available until the present improvement, this because of the channelling and reuniting drawback as hereinabove described. The term "complete separation" is understood to mean within the commercial requirements such as of two percent or less of the undesired component.

The withdrawal from the decanter of the more fluid component usually presents no difficulty. The raw liquor may be continuously supplied and thus maintain the necessary quantities of the respective components for substantially continuous operation in a constantly filled decanter.

The separating method and apparatus of the present invention provide the means for the advantageous withdrawal of the more viscous component regardless of relative viscosity and gravity of the component liquids, namely, by withdrawing the more viscous component at the desired rate (according to conditions existing) during controlled periods of time in scheduled rotation or succession, from a series of "cells" or subdivisions of that part of the space in the decanter occupied by the more viscous component, in such manner that only the separated more viscous component is permitted to reach and enter the withdrawal outlet. The material in each cell is caused to pass through succeeding operative cycles, each consisting of an active period of motion or flow during withdrawal followed by a quiescent period which permits the readjustment of liquids and levels to the static balance condition and also the accumulation of further quantities of the separated component to be removed during the next succeeding active or withdrawal period.

The number of cells or accumulation compartments, at least two and preferably several more than two, the operational schedule for the cycle of each of the individual cells and of the group, and the rate of withdrawal, can be readily adapted to meet an unlimited variety of practical conditions. With the general conditions preestablished by the physical installation, the withdrawal rate can be readily adjusted from time to time to meet the normal variations in the rate of production or supply of the liquid mixture and the respective components thereof.

The accompanying drawings show several illustrative forms of apparatus and method embodying the present invention. Fig. 1 is a plan view of a separating or decanter apparatus with the cover partly cut away to show the interior. Fig. 2 is a vertical sectional view taken through the decanter on the line 2—2 of Fig. 1.

Fig. 3 is a longitudinal vertical central sectional view through a suitable controlling or multiport valve like that seen in Figs. 1 and 2, constituting a means for effecting the cyclic operation of withdrawal from the several cells. Fig. 4 is a cross sectional view through this multiport control valve taken on the line 4—4 of Fig. 3. Fig. 5 is a development of the cylindrical wall of the rotating element of this multiport control valve, showing also in dotted lines the ports in the stationary element below to which the several withdrawal pipes are connected.

Fig. 6 is a diagrammatic representation of an example of the varying proportions of the respective components that may exist at various levels in the decanter; the vertical dimensions of the diagram corresponding to those of Fig. 2.

Fig. 7 is a diagrammatic representation, in vertical sectional view, of a single withdrawal outlet of a cell, showing by arrows the approach of the particles of the separated component in various directions toward the mouth or outlet and indicating by the lengths of the arrows the possible variation in the velocity of approach of liquid to the outlet from the several directions; taken for example on the section line 7—7 of Fig. 1.

Fig. 8 is a plan view of a modified decanter, with the cover omitted, wherein the cell structure is placed at the top of the decanter for the withdrawal of a liquid component which is both the more viscous and the lighter component, as distinguished from the location of the cells at the bottom as shown in Figs. 2 and 7. Fig. 9 is a diagrammatic development of the cell structure of Fig. 8 along the broken line 9—9 of Fig. 8.

Fig. 10 is a horizontal sectional view on the section line 10—10 of Fig. 11, and Fig. 11 is a vertical section view on the section line 11—11 of Fig. 10; these figures showing a modification or third embodiment wherein gravity withdrawal from the decanter tank is provided in lieu of the positive pump shown in Figs. 1 and 2, retaining however the outflow control valve for controlling the manner of withdrawal from the series of cells; in this instance the gravity withdrawal being of the more viscous liquid when that liquid is also the more dense liquid, as is the case with Figs. 1 and 2.

Figs. 1 and 2 indicate the preferred arrangement of a decanter for the separation of components in a practical case in which the heavier component is the more viscous. The tank 11 of the decanter may be constructed with a bottom 12 and surrounding side walls 13 to receive and hold an ample body of liquid in process of separation and withdrawal; and it may be for example from about 10 to 30 feet in diameter. A top or cover wall 14 closes the vessel and may support certain apparatus parts. Conventional try-cocks 15 may be inserted in the wall 13 for testing, at several levels, the character of the liquid thereat.

During operation the separated more viscous liquid V, which may be tar, occupies a first layer or zone X which may be the bottom layer in the vessel, reaching from the vessel bottom up to an approximate zone line or separation plane $v$. The least viscous or most fluent liquid F, as water, occupies the top layer or zone Z, down to a division or zone line $f$. Between the approximate division lines or planes $v$ and $f$ is an intermediate layer or zone Y of a combination or mixture M of components V and F, naturally with no fixed position nor definite separation, but throughout which middle layer are appreciable proportions of the two or more component liquids; the liquid V being of maximum proportion at transverse plane $v$ and tapering off to zero or negligible presence at plane $f$, and vice versa.

According to this invention the space in the decanter occupied by the separated more viscous liquid, as the lower part in Fig. 2 or the upper part in Fig. 9, is subdivided or partitioned into a series of distinct separating cells or compartments C or C' wherein the more viscous, in Fig. 2 the denser or heavier liquid, can accumulate by gravity classification or settling. For example, referring to Figs. 1, 2 and 7, a center cell may be formed by interior cell walls 17, while radial walls 18 may extend between cell walls 17 and enclosing tank wall 13, to form for example six more cells, a total of seven settling cells within the decanter. The description will be continued as to Figs. 1 to 7 before detailing the inverted system of Figs. 8 and 9.

The combined components are fed or admitted to the decanter inlet 20 through supply pipe 21, or several thereof, at a level above the top of the partitions 17 and 18 forming the subdivisions or cells C; and the infeed may be at about the expected level of line $f$ in order to minimize agitation therebelow. The cell partitions extend from the tank bottom upwardly through the layer or zone X of separated component V and into the intermediate layer Y of separating components V and F. The top edges of the cell partitions are well below the top line $f$ of the intermediate layer or zone of separating components.

In operation the lighter component continuously tends to rise to the top of the decanter space, where it is allowed to overflow the weir or dam plate 23, and it may be thence withdrawn to any desired disposal through disposal pipe 24.

The heavier, in this case the more viscous component V, progressively sinks toward the bottom of the decanter where it is received in the several cells C and there accumulates; and it is withdrawn from each cell through an outlet mouth 26 suitably placed, preferably near the cell bottom and leading to the exterior. For example in each cell the outlet mouthpiece 26, which preferably is downwardly flared, that is, tapering or converging in the direction of flow, and thus presents a greater length of portal periphery and reduces to the minimum the velocity of particles passing the portal edge and provides also the maximum time for the movement of the viscous component, is shown connected to an uptake or withdrawal pipe 27, extending through zones X, Y and Z, and the several pipes 27 all leading to a multiport control valve 29; and from the valve leads a suction pipe 30 extending to a liquid removal means, shown as a pump 31 the discharge 32 of which leads to a desired disposal. This pump, driven by motor 33, is preferably positively acting so that in addition to forwarding, it regulates the rate of withdrawal of, the separated viscous liquid. The pump speed, to prevent excessive or deficient withdrawal flow, may be regulated either by observation at the try-cocks 15 and manual adjustment, or by any known means of automatic adjustment, mechanical, electrical or otherwise.

Optionally, withdrawal can be provided by gravity if it is desired to dispense with a pump, namely, by arranging withdrawal pipes 27 to pass through the wall of the tank well below the top liquid level in the decanter and leading to a flow control means or valve placed low. When gravity withdrawal is thus provided, means must be installed to afford control of the rate of withdrawal from the cells; and this rate control means may be a flow regulating valve, in lieu of the positive pump, with manual or automatic action. This modification will be described hereinafter in connection with Figs. 10 and 11.

The multiport control valve 29 as illustrated in Figs. 3, 4 and 5 consists of a stationary exterior element or cylinder 34 and a rotating interior element or sleeve 35. The withdrawal pipes 27 are connected to the stationary valve element 34 through separate ports 36, preferably in alinement as shown and cooperating with sleeve element ports 37 next to be described. The suction pipe 30 connects to the end head or cover 39 of the stationary element 34.

The interior or rotating valve element 35 is formed with a series of separate inlet ports 37, each corresponding to and registrable with one of the fixed ports 36, with special timing to be described. The rotating element has an end cross piece 41 through which it is driven by a shaft 42 which passes through the end cover or head 43 of the stationary element 34 and through a stuffing box 44 and gland 45. The shaft and valve may be driven as slowly as one turn in several hours, namely, by means of a motor 46 and speed reducer 47 as shown.

The ports 37 are positioned in the wall of the rotating or sleeve element 35 in a manner, in cooperation with the fixed ports 36, to afford rotation in the actions of the series of cells. One port pair is provided for each withdrawal connection or pipe 27. The movable ports 37 are spaced both longitudinally and circumferentially relatively to the ports 36 to give the desired control. For example, the ports 36 being shown in straight line, ports 37 are shown spaced equidistantly circumferentially or along a helical portline; or the arrangement could be relatively reversed. For continuous operation the ports in the rotating element are preferably so arranged relatively to the fixed ports that at all times at least one withdrawal pipe 27 will be connected to the suction pipe 30 through the ported rotating element of the valve 29. Overlapping of port actions is desirable, as shown, so that each pair of ports makes a gradual start in opening while the next preceding pair is gradually closing; the pump thus drawing liquid from two ports and two cells, during the time of overlap, at a lesser rate from each cell. Other valve arrangements are possible.

As the valve rotating element or ported sleeve slowly turns in its cycle of operation the several pairs of ports in succession open slowly to full open position and then close slowly to full shut position. This slow opening of the ports allows time for the gradual acceleration of the slow moving viscous component in its movement toward the withdrawal outlet and thereby partially offsets the tendency to channel, thus improving the resulting separation of liquid components.

By the operation of the multiport control valve, when arranged for continuous withdrawal, each of the cells, in repetitive predetermined sequence, is made to pass through the withdrawal cycle of active flow alternated with quiescence. The time required for the full cycle for each cell is determined by the time allowed for one revolution of the driven rotating element of the multiport control valve. The relation of the duration of the quiescent period to the withdrawal period of each cell is determined by the number of subdivisions or cells, and by the circumferential extent of the ports of each cooperating pair; for example with seven cells and port pairs there may be two sevenths of each cycle for withdrawal of viscous liquid and five sevenths of each for quiescence and re-accumulation.

Other means of cell operation control than the described valve 29 are available in the form of known devices both mechanical and electrical in action. A multiport control valve such as that shown and described is preferred since it provides for the cells a gradual transition from the quiescent to the withdrawal period of the cycle, which minimizes disturbance of the separation action and is best suited to the accomplishment of the purposes of this invention. It makes it possible to recombine into a single final stream, at the pipe 30 and beyond, the several streams of viscous liquid flowing from the cell system to the valve.

The diagram of Fig. 6 represents graphically an example of the change that may take place within the body of liquid, extending from the separated lighter component at the top of the decanter to the separated heavier component at the bottom of the decanter. The curve is hypothetical and is intended to indicate, as one example, the approximate relation of the components at the various levels throughout the height of the decanter.

Fig. 7 shows diagrammatically the manner of flow of the particales of separated heavier component, by means of flow arrows, and indicating by the length of the arrows a possible condition of relative velocity of movement of the particles flowing along the various directions from vertically-down to horizontal, toward the outlet mouth 26.

A preferred instance has thus been disclosed of the principle of partial subdivision of the total decanter space into a series of upright cells wherein to receive and accumulate the more viscous liquid in separate portions to be drawn off or let out methodically in a manner to afford for each cell a periodic quiescent interval for recuperation while continuously outfeeding the viscous component from the cell series through a common final delivery by way of a flow controller or multiple valve means. The general space in the vessel is preferably free of subdivision (though it may contain baffle means) and the cellular or partitioned space is at a different level from, that is, below or above, the general space according to whether the more viscous liquid is the one having the greater or the lesser density.

Figs. 8 and 9 show a modification or second embodiment illustrating the application of the separating process of this invention to the separation of a combination M' of immiscible liquids in which the lighter liquid V' is more vicous than the heavier liquid F'. The tank 51 has a bottom 52 and side wall 53, and partitions 54 and 55; and its inlet 56 is supplied by a feed pipe 57. The subdivisions or cells C' are now placed at the top of the decanter; and the liquid zones or layers X', Y' and Z' are in inverted order, as are the boundary lines or planes $v'$ and $f'$. The partitions 54 and 55 forming the cells extend down through the layer X' of separated lighter, more viscous component and into the intermediate layer Y' of separating components. The bottom edges of the partitions are placed below the lines $v'$ but above the bottom level $f'$ of the intermediate layer Y' of separating components and well above the zone Z'.

Fig. 9 in a vertical sectional view is a development taken through the decanter along the broken line 9—9 of Fig. 8. Line $v'$ is intended to indicate the approximate bottom of the layer X' of separated lighter, more viscous component V' which also is the top line of the intermediate layer Y' of separating components. Line $f'$ is intended to indicate approximately the top of the layer Z' of separated heavier component F' which also is the bottom of the intermediate layer Y' of separating components. This diagrammatic development pictures more clearly the conditions in the series of cells at one particular point in a cycle.

The decanter is shown in Figs. 8 and 9 with seven cells or subdivisions, numbered C'1 to C'7 for explanation. The withdrawal connection of cell No. C'4 is assumed to be full open. The withdrawal connection of cell No. C'3 will have just closed, and that of cell No. C'5 is about to open; while the other four cells have progressively varying conditions between those of cells C'3 and C'5. The lines v' in the various cells are imaginary or diagrammatic and are intended to indicate the depth of the layer X' of separated lighter component V' as it accumulates in each of the several cells in the time interval since the end of the previous withdrawal period in each particular cell. The top lines t' indicating the surface of the more viscous lighter component V' are shown at different levels. The column of heavier component in outlet pipe 58 and overflowing weir 59 to pipe 60 balances varying columns of separated and separating components in the several cells. The greater the quantity of lighter component in the balancing column the greater must be the difference in surface level to provide the necessary balancing weight.

The withdrawal mouths or outlets 62 and ascending pipes 63 are indicated as arranged for pump withdrawal as in Figs. 1 and 2; but the withdrawal pipes may be brought through the tank walls and arranged for gravity withdrawal, as shown in Figs. 10 and 11.

In Fig. 9 the withdrawal mouths 62 are indicated with downward opening. The problem in this instance varies from the previously described problem wherein the heavier liquid is the more viscous. In the latter problem the motion is downward in the direction of gravity acceleration and the flow velocity is the resultant of cumulative forces. In the case where the more viscous component is also the lighter one the flotation of the viscous particles is in the direction opposed to gravity acceleration and the velocity is the resultant of opposed forces; wherefore the outlets are faced downward or upward depending on the specific conditions of the case.

The separated heavier component flows through outlet pipe 58, over weir 59 and is delivered through pipe 60 to waste or storage as desired.

While continuous removal or overflow of accumulating less viscous component, e. g. in the top zone, is indicated, the described principles may be useful with each component, as tar below and water above, removed cyclically, that is, in celled portions, in rotation, or with periods of outflow alternated with quiescence. In this way the cleanliness of the waste disposal of certain plants may be greatly improved, where the wastes are arranged to flow into rivers, permitting the previous removal even of the iridescent film that tends to spread upon the surface of the water.

For convenience of definition the following considerations should be understood. The decanter space contains at least the three zones X, Y and Z or X', Y' and Z' described, comprising what may be called the middle or entry zone, to which the raw liquor mixture is supplied, between two end zones, all in superposed relation; the more fluent component accumulating in the first and the more viscous in the second of the end zones, either of which may be the top or the bottom zone; the more dense component however, whether the more or less viscous, settling of course in the bottom end zone or layer, the less dense rising to the top end zone. The supplied mixture is fed methodically to the mid-zone, and the more fluent separated component is methodically outfed from the first end zone, being the top zone in Fig. 2 or the bottom zone in Fig. 9. As to the separated viscous component, it is its zone, the second end zone, that is subdivided into the series of upright cells, being the bottom zone in Fig. 2, the top zone in Fig. 9; receiving viscous liquid from the general space and accumulating it in separated small portions or fractions. In either instance the withdrawal of separated viscous liquid is from near the distal ends of the cells, i. e. furthest from the mid-zone, effected by the mouths, so located, and the outtake passages therefrom. The multiport valve is an instance of a common flow control means for all the cell outtakes, operable in cycles, methodically to withdraw the more viscous component in rotation from the several cells thereby to afford for each cell in each cycle a withdrawal period alternated with an interval of quiescence for accumulation of a new portion of the component, while avoiding the entry into the outtake of the liquid mixture or the less viscous component. In Fig. 2 the more viscous is also the denser component so that the cell structure is at the bottom zone and the outtake mouth near the lower end of each cell; in Fig. 9 the opposite is the case. Preferredly the withdrawals are by upflow in uptakes, with suction or pump means to promote flow, preferably a single pump, beyond the flow control or valve means which predetermines the cyclical action; the valve means being exemplified by a multiport valve having a common chamber or manifold through which passes all the viscous liquid drawn through the cell outtakes, and mechanical means for operating in sequence the several valve devices or port pairs for rotational sequence of withdrawal. These considerations indicate in one aspect the substance of the present invention from the viewpoint either of apparatus or process.

By a partial embodiment of the full disclosure the advantage is retained that each cell is afforded a quiescent interval for recuperation and collection of separated component, but instead of working the cells in complete rotation they may be worked in groups, or even the entire bank of cells subjected to withdrawal simultaneously, between quiescent intervals. This is readily provided by arranging both port rows in straight lines, all becoming operative in the same time period and all inoperative, and cells passive, in the same interval. In some cases this may be of a certain advantage in that the entire decanter content may be quiescent, especially in the separated zones, for better decanting action. The infeed of new mixture in such case however need not be intermittent, since the contemporaneous withdrawal at many or all cells tends to cause substantial depletion of liquid volume, which the uninterrupted supply of further mixture tends to overcome.

The third embodiment, shown in Figs. 10 and 11, corresponds in part with the first embodiment shown in Figs. 1 to 7, both dealing with combinations of liquids of which the more viscous is also the more dense, but in Figs. 10 and 11 the withdrawal or offtake of the separated more viscous liquid from the bottom-located cells C being by or with the action of gravity rather than by the upward pull of a pump against gravity;

the withdrawal pipes 27A from the low outlet mouths 26 extending upwardly from the cells and thence through the side wall 13 of the decanter tank 11A well below the top liquid level in the tank, to afford ample head, and leading to the flow control means or valve 29 now shown located on a platform 65 at a low elevation compared with that of the high valve 29 of the first embodiment; the action of such control valve being manually or automatically effected, a motor 46 being shown as in the first embodiment driving the valve slowly through a reduction gear 47. The volume control, as before, may be through the positive pump 31, seen in Fig. 10, driven regularly by the motor 33, beyond the valve 29 and pipe 30, and delivering the more viscous liquid through the pump discharge or disposal pipe 32. The pump and its suction pipe are located at the low-level platform 65, wherefore the pump operates under a constant positive inlet pressure, materially improving the pump's action as a volume control means, and obviating the possibility of its becoming vapor-bound.

The following among other elements of Figs. 10 and 11 are as in Figs. 1 and 2; the decanter bottom 12 and cover or top wall 14; the try-cocks 15; the cell central and radial walls 17 and 18; the inlet liquid nozzle 20 within the middle part of the tank and the initial supply or infeed pipe 21 leading thereto; the weir 23 for overflow of less dense liquid and the disposal pipe 24 therefrom. The general operation and results are like those described for the first embodiment, but each having its specifically different action and advantages useful in particular situations.

It should be pointed out that in the third embodiment, wherein is employed gravity withdrawal of the more viscous separated liquid to the multiport or control valve 29 under constant and positive head, any conventional type of volume control for such withdrawal may be utilized such as a pump means as the pump 31 in Figs. 10 and 11 for regulating the rate of the withdrawal of the more viscous liquid component.

There have thus been described liquid separating methods and apparatuses embodying the principles and attaining the objects of this invention. Since many matters of operation, combination, construction and arrangement may be variously modified without departing from such principles it is not intended to limit the invention to such matters except to the extent set forth in the appended claims.

I claim:

1. Liquid separation apparatus for continuously operating upon a mixture of a plurality of liquid components having different densities and viscosities for the substantially complete separation thereof, comprising an upright decanter vessel having an enclosed space of substantial height and capacity providing subspaces adapted to contain in superposed relation a middle volume of a mixture of the components located between a first end volume of a separated more fluent component and a second end volume of a separated more viscous component, and with the separated lighter and denser component volumes respectively within the top and bottom end spaces of the vessel; and associated with such upright vessel an infeed means located and adapted for methodically supplying liquid mixture to discharge directly into the middle space of the vessel, and a liquid-level-maintaining overflow means located and adapted for methodically outfeeding from the first end space of the vessel the gravity-separated more fluent component in excess of the capacity of the vessel to contain the same; and characterized in that within the second end space of the vessel is a plurality of fixed partitions subdividing it into a series of separate upright cells open toward and adapted to receive from the middle space and to accumulate the gravity-separating more viscous component in a series of separate portions thereof, together with separate liquid withdrawal means for the respective cells each consisting of a separate outlet mouth near the distal end of the cell and a separate withdrawal outtake leading therefrom, and a common flow timing control valve means for controlling all of said series of outtakes and consisting of a series of several individual valve-pairs each connected to one of said outtakes, each valve-pair having a movable member for opening and closing it, and means to operate said movable valve members to open and close the valve-pairs in predetermined sequence, methodically through successive cycles, whereby to cause withdrawal intermittently from each cell and in rotation from the several cells, of such more viscous liquid component; thereby to afford for each cell periods of withdrawal alternated with substantial intervals of high quiescence and accumulation therein of the more viscous liquid component, and for the cell series a continuous outfeed of the separated more viscous component.

2. Apparatus as in claim 1 and wherein, for separation of a liquid mixture in which the more viscous component is the denser, the bottom end space is the one subdivided into cells, and said cells are open above and have their outlet mouths near the lower ends thereof; while the more fluent lighter component outflows over said liquid-level-maintaining overflow means to the extent of its excess above the capacity of the vessel.

3. Apparatus as in claim 1 and wherein, for separation of a liquid mixture in which the more viscous component is the lighter, the top end space is the one subdivided into cells, and said cells are open below and have their outlet mouths near the top ends thereof; while the more fluent heavier component outflows from the bottom end space to a liquid-level-maintaining overflow means located slightly below the top level of the vessel.

4. Apparatus as in claim 1, having uptake pipes and a timing control valve means, and wherein the viscous liquid withdrawal from the series of cells is by outflow in said uptake pipes, which pipes extend to said timing control valve means, in which the flows combine; in combination with a volume-control pump means beyond the valve means operating to draw the outflowing liquid through said uptakes and valve means for continuous united final delivery.

5. Apparatus as in claim 1 and wherein is a common final delivery passage pipe to which the common flow control means conducts the viscous liquid withdrawn in rotation from the series of cell outtakes.

6. Apparatus as in claim 1 and wherein is a common final delivery passage pipe to which the common flow control means conducts the viscous liquid withdrawn in rotation from the series of cell outtakes; and said flow control valve means comprises a multiport valve having a common manifold chamber and a series of valve port-pairs through which the series of outtakes deliver to the common chamber, and said mechanism comprises means for operating in sequence said valve port pairs to give to each outtake a brief open period and a prolonged closed interval.

7. Apparatus as in claim 1 and wherein is a common final delivery passage pipe to which the common flow control means conducts the viscous liquid withdrawn in rotation from the series of cell outtakes; and said flow control valve means comprises a multiport valve having a common manifold chamber and a series of port-pairs through which the series of outtakes deliver to the common chamber, and said mechanism comprises means for operating in sequence said valve port pairs to give to each outtake a brief open period and a prolonged closed interval; each valve port pair having an open period overlapping the open periods of the next preceding and succeeding port pairs, in rotation, thereby to afford continuous withdrawal of viscous liquid from the vessel.

8. Apparatus as in claim 1 and wherein is a common final delivery passage pipe to which the common flow control means conducts the viscous liquid withdrawn in rotation from the series of cell outtakes; and said flow control valve means comprises a multiport valve having a common manifold chamber and a series of port-pairs through which the series of outtakes deliver to the common chamber, and said mechanism comprises means for operating in sequence said valve port pairs to give to each outtake a brief open period and a prolonged closed interval; each valve port pair having an open period overlapping the open periods of the next preceding and succeeding port pairs, in rotation, thereby to afford continuous withdrawal of viscous liquid from the vessel, and each port pair being constructed and operating to give a gradual opening thereof, with gradual acceleration of outflow from the corresponding cell in each cycle, and therefore minimum agitation in such cell.

9. Apparatus as in claim 1 and wherein a mixture of two liquids is infed continuously to the vessel middle space, the recited elements being in combination with an overflow weir for the continuous outflow from the first end space of the excess separated more fluent liquid.

10. Apparatus as in claim 1 and wherein the subdividing partitions and the decanter cells thereby formed extend through the full height of the second end space of the vessel, whereby each cell may receive and contain some of the separating mixture and the group of cells will contain all of the separating viscous component, such subdivision thereby promoting quiescence and effective separation in each cell protected from agitation by infeed and by withdrawals from other cells.

11. Apparatus as in claim 1 and wherein the withdrawal control valve means is located well below the vessel top level sufficiently to receive the viscous component from the cells by gravity head.

12. Apparatus as in claim 1, having a flow-volume-controlling pump, and wherein is withdrawal timing control valve means located below the vessel top level sufficiently to receive the viscous component from the cells by gravity head; and beyond the valve is located said controlling pump at low level with its inlet receiving such component under positive head.

13. Liquid separation apparatus for continuously operating upon a mixture of liquid components differing both in their densities and viscosities with consequent tendency of a body of such mixture to separate by gravity into superimposed zones which may be designated as (a) separated less viscous liquid zone, being that portion of the volume of the separation apparatus toward which the separated less viscous liquid is constantly progressing and in which it accumulates, (b) separated emulsified liquid zone, being that portion of the volume of the separation apparatus toward which the more viscous liquid and its emulsion are constantly progressing and in which they accumulate and in which accumulation the separation of the emulsified liquids by decantation is constantly proceeding so that the separated more viscous liquid accumulates at the distal end of the separated emulsified liquid zone, and (c) inlet liquid zone, placed between the separated less viscous liquid zone and the separated emulsified liquid zone, being that portion of the volume of the separation apparatus into which the mixture, as produced, is admitted and in which the separation of the liquid components is initiated, and the volume of which superimposed zones (a, b and c) constitutes the total volume of the separation apparatus; said separation apparatus comprising (1) a decanter vessel adapted for continuously receiving a mixture of liquids, for continuously separating the component liquids and for continuously separately delivering the separated component liquids, said vessel being a tank having considerable vertical dimensions; (2) means for continuously infeeding into the vessel the mixture as produced; (3) said vessel containing middle-positioned capacity space for receiving the mixture and starting the separation process, (4) and end-positioned capacity space for accumulation of separated less viscous liquid; with (5) means for outflowing by gravity all separated less viscous liquid in excess of the capacity space provided; and (6) end-positioned capacity space for accumulation of separated emulsified liquids for separation therein of the component liquids by decantations; (7) means for protecting during decantation the separating emulsified liquids from disturbance by liquid movements within the decanter vessel, consisting of partitions forming a plurality of upright cells within said capacity space, (8) withdrawal means for the separated more viscous liquid in excess of the capacity space provided consisting of an outlet mouth near the distal end of each upright cell and a separate outtake leading therefrom, and (9) a common flow control means for controlling all said outtakes from said upright cells and consisting of a series of several individual valve-pairs each connected to one of said outtakes, each valve-pair having a movable member for opening and closing it, and means to operate said movable valve members to open and close the valve-pairs in predetermined sequence, methodically in successive cycles for withdrawal intermittently from each cell and in rotation from the several cells, thereby to afford for each cell periods of withdrawal alternated with substantial intervals of undisturbed quiescence and accumulation therein of the more viscous liquid.

14. Method for the continuous and substantially complete separation of the liquid components of a liquid mixture wherein the components are of different densities and viscosities, comprising supplying the liquid mixture to a decanting vessel to maintain in said vessel three superposed zones of liquid, comprising a middle zone between first and second end zones, of which zones the second end zone is subdivided into a series of open ended upright cells, namely, by feeding the liquid mixture methodically into the middle zone to cause gravity classification thereof therein, with the lighter component rising into the top end zone and the denser component settling into the bottom end zone, and with the more fluent of the liquid components passing into a first one of such end zones and the more viscous component into the second one of such end zones, and, concurrently therewith, methodically outfeeding the excess of more fluent separated component from the first end zone as by overflow; passing the more viscous component from the middle zone into the cells of the second end zone and accumulating it in separate portions therein, and methodically intermittently withdrawing such more viscous liquid component from the respective cells by way of separate outlet mouths near the distal ends of the respective cells and by way of separate outtakes therefrom, namely, in cycles and in such manner that in rotation the several cells each have in each cycle a withdrawal period alternated with a substantial interval of high quiescence for the accumulation of the more viscous liquid.

15. The method as in claim 14 and wherein the portions of more viscous component intermittently withdrawn from said cells in each cycle are reunited into a continuous outfeed flow of such more viscous component.

16. The method as in claim 14 used for the decanting separation of liquid components of which the more viscous is the more dense, and wherein the more viscous component settles into the cellularly subdivided bottom end zone for accumulation of the more viscous component in separate portions; and wherein the more viscous component is intermittently withdrawn by way of an outtake passage from each cell whose outlet mouth is in the lower part of the cell.

17. The method as in claim 14 used for the separation of liquid components of which the more fluent is the more dense, and wherein the more viscous component rises into the cellular top end zone for accumulation of the more viscous component; and wherein the more viscous component is intermittently withdrawn by way of an outtake passage from each cell whose outlet mouth is in the upper part of the cell.

18. The method as in claim 14 and wherein the outtake withdrawal of the more viscous component is effected upwardly from each cell and out of the decanter vessel to a common manifold chamber, and promoting such outflow from the series of cells by a suction pumping action located beyond said chamber, and methodically controlling the flow from the several outtakes to said chamber and pumping action in a manner to open the flow from each outtake for a period of flow and then close it for an interval of quiescence, in each cycle, and performing such operations in rotation for the several outtakes, thereby to provide a continuous outflow through said chamber and pumping action to a common final delivery.

19. The method as in claim 14 and wherein the rotational periods of withdrawal of more viscous component through the respective cell outtakes are controlled and timed to overlap thereby to ensure continuous outflow from the vessel and to a final delivery at a rate commensurate with the infeed.

20. The method as in claim 14 and wherein the rotational periods of withdrawal of more viscous component through the respective cell outtakes are controlled and timed to overlap thereby to ensure continuous outflow from the vessel and to a final delivery at a rate commensurate with the infeed; and wherein for each cell the period of withdrawal is initiated gradually thereby to minimize acceleration rate and disturbance within the cell.

21. The method as in claim 14 and wherein the cells maintained in the second end zone of more viscous component extend completely through such second zone, whereby gravity separation of the more viscous component is continued throughout the depth of each cell, and the separating components therein are protected from agitation from other cells and from the entering mixture in the middle zone.

22. Method for the continuous and complete separation of the separable components of a liquid mixture composed of a more fluent liquid component and a more viscous liquid component the two having substantially different densities, comprising passing the liquid mixture through a decanting vessel in a manner to maintain therein in superposed position, a middle entry zone between first and second end zones, and in which the liquid mixture is admitted within the entry zone at a level adjacent to the second separating liquid zone, and is protected, during decantation, from the re-mixing tendency of the liquid movements within the decanting vessel, namely by conducting the separating action within a plurality of walled cells, formed in said second end zone by upright partitions, each cell being equipped with a withdrawal outlet at its distal end and being connected by a passage to a controlled withdrawal means outside of the decanting vessel; so that the more fluent liquid component, separating from the mixture within the several walled cells, is progressed continuously toward the separated liquid first end zone into which it is merged, the excess thereof being withdrawn from the decanting vessel by gravity through a withdrawal outlet at the distal end of the separated liquid first end zone, and is therebeyond overflowed at a predetermined level so that the decanting vessel is continuously filled to said predetermined level; and progressing the more viscous component, decanting from the liquid mixture in the several walled cells, continuously to the withdrawal outlet at the distal end of the respective cells and, in accordance with a controlled determined schedule, methodically withdrawing such more viscous component from each and every cell without disturbing the orderly progress of the decantation process in any cell other than those from which viscous component is currently being withdrawn; and withdrawing the separated more viscous component from the several cells and from the decanting vessel at an adjusted rate to balance substantially the input of more viscous component whereby to maintain the separating liquid zone.

23. Liquid separation apparatus of the kind described for operation upon mixtures of liquid components, comprising a decanter vessel containing an intermediate entry space between opposite end spaces, all of substantial depth and capacity, and an overflow outlet, the first of which end spaces is adapted to receive from the entry space a separated first liquid component and at its distal end is connected to said overflow outlet permitting free outflow therefrom of the excess of such separated component received therein, and the second of which end spaces has partitions subdividing it into a series of separate upright cells of substantial height and open at their proximal ends to receive liquid from such entry space;

and an infeed passage arranged to supply liquid mixture into such entry space of the vessel beyond such cells; said cell series being adapted to receive from such entry space such mixture and to decant and accumulate in such cells a second separated liquid component in segregated portions, and each cell having an outlet port near its distal end with an outlet passage leading from said port for withdrawal of such separated second component; a multiple flow-control valve having a fixed valve member formed with a series of separate inlet ports to which said respective cell outlet passages lead, and a cooperating movable valve member formed with a corresponding series of ports arranged to register in rotation with the respective ports of the fixed valve member in overlapping sequence, whereby said valve is adapted and operable, to cause methodical withdrawal in cycles from the series of cells in rotation, with intermittent withdrawals from each cell alternated with substantial intervals of suspension therebetween; whereby through cycle after cycle for each cell occur successive periods of withdrawal of such separated second component alternated with substantial intervals of high quiescence, and for the cell series a continuous combined outflow of such component from the multiple valve toward a common disposal; and means for so operating said valve.

24. Liquid separation apparatus as in claim 23 and wherein the first end space is free of agitation-producing obstruction, and is adapted to deliver a continuous outflow of the separated first component; and wherein the cells of the second end space are open at their proximal ends and are of depth of the order of half the depth of the vessel and are closed at their ported distal ends; and wherein the multiple valve is adapted to combine the successive withdrawals received from the cells into a continuous onflow of the separated second component; and wherein beyond the valve is a pump receiving from the valve and promoting the outflow.

25. Liquid separation apparatus as in claim 23 and wherein the first end space is free of agitation-producing obstruction, and is adapted to deliver a continuous outflow of the separated first component; and wherein the cells of the second end space are open at their proximal ends and are of depth of the order of half the depth of the vessel and are open and thereby vented at their distal ends; and wherein the multiple valve is adapted to combine the successive withdrawals received from the cells into a continuous onflow of the separated second component; and wherein beyond the valve is a pump receiving from the valve and promoting the outflow.

26. Separating apparatus for continuously recovering the separable liquid components, having substantially different densities and viscosities, from a continuous flow of an emulsion or other mixture thereof, comprising a decanting vessel constructed to contain in superposed relation a middle entry zone between (1) a first end zone for receiving the separated more fluent component of the inflow and (2) a second end zone for receiving the more viscous component in mixture with part of the more fluent component; and the said decanter being fitted with inlet means for continuously infeeding to its middle entry zone the inflow of mixture to be separated; and said entry zone being adapted to deliver separated fluent component to the said first end zone for discharge from the decanter, and to deliver viscous component and mixture to the second end zone for separation therein and for withdrawal from the decanter of separated viscous component; the said first end zone being provided at its distal end with an outlet passage, and there being therebeyond a liquid-level-maintaining overflow means by the action of which the decanter is continuously maintained filled to a predetermined level; the said second end zone being provided with interior walls by which it is partitioned into a plurality of upright cells constituting cellular subdivisions adapted to receive viscous component and mixture from the said middle entry zone and adapted during the separation of viscous component to isolate and protect the contents of each of the several cells from disturbance by liquid movements occurring in other cells; a controllable-volume flow-forwarding withdrawal means and in sequence connection therewith a flow-control valve means; each of the said cells being provided with a withdrawal outlet at its distal end connected by a withdrawal passage to the said sequence of valve means and withdrawal means, for further onflow and disposal of the separated viscous component; the said valve means comprising a series of ports adapted to operate in pairs to constitute a series of withdrawal valves, each withdrawal passage being connected to one of the said valve-port-pairs, and each port-pair having a movable port member for opening and closing the port-pair; driving means adapted to operate the said movable port members to open and close the several port-pairs methodically in repetitive cycles of predetermined open and closed cycle portions in a manner to cause, for the respective cells, periods of active withdrawal alternating with quiescent intervals of predetermined relative duration; the said withdrawal means and said valve means being arranged and adapted to cooperate to withdraw the separated more viscous component from the several cells at such predetermined rate as to balance substantially the rate of inflow into the decanter of the more viscous component of infed mixture whereby to maintain in the decanter such second end zone of separating mixture.

JAMES F. HUNTER.

REFERENCES CITED

The following references are of record in the file of this patent:

UNITED STATES PATENTS

| Number | Name | Date |
| --- | --- | --- |
| 1,027,948 | Wehr | May 28, 1912 |
| 1,115,827 | Johnson | Nov. 3, 1914 |
| 1,116,903 | McClintock | Nov. 10, 1914 |
| 1,645,093 | Comyn | Oct. 11, 1927 |
| 1,650,478 | Wimberley | Nov. 22, 1927 |
| 1,698,002 | Pink | Jan. 8, 1929 |
| 1,708,021 | Lenz et al. | Apr. 9, 1929 |
| 1,733,324 | Wetherbee | Oct. 29, 1929 |
| 1,761,505 | White | June 3, 1930 |
| 2,075,224 | Porteous | Mar. 30, 1937 |
| 2,179,131 | Millard | Nov. 7, 1939 |
| 2,213,458 | Buckley | Sept. 3, 1940 |
| 2,284,737 | Hirshstein | June 2, 1942 |

FOREIGN PATENTS

| Number | Country | Date |
| --- | --- | --- |
| 114,921 | Great Britain | Apr. 25, 1918 |
| 513,308 | Great Britain | Dec. 28, 1937 |